United States Patent
Tidestav

(10) Patent No.: US 9,253,769 B2
(45) Date of Patent: Feb. 2, 2016

(54) PILOT SIGNAL ASSIGNMENT

(75) Inventor: Claes Tidestav, Bålsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 220 days.

(21) Appl. No.: 14/002,732

(22) PCT Filed: Mar. 3, 2011

(86) PCT No.: PCT/SE2011/050244
§ 371 (c)(1),
(2), (4) Date: Sep. 2, 2013

(87) PCT Pub. No.: WO2012/118417
PCT Pub. Date: Sep. 7, 2012

(65) Prior Publication Data
US 2013/0336157 A1   Dec. 19, 2013

(51) Int. Cl.
*H04W 72/04* (2009.01)
*H04L 5/00* (2006.01)
*H04W 28/06* (2009.01)
*H04W 48/08* (2009.01)
*H04W 88/08* (2009.01)

(52) U.S. Cl.
CPC ........... *H04W 72/042* (2013.01); *H04L 5/0048* (2013.01); *H04W 28/06* (2013.01); *H04W 48/08* (2013.01); *H04W 88/08* (2013.01)

(58) Field of Classification Search
USPC ........................................................ 370/252
See application file for complete search history.

(56) References Cited

U.S. PATENT DOCUMENTS

| 6,119,005 | A * | 9/2000 | Smolik ........................ 455/436 |
| 6,327,468 | B1 | 12/2001 | Van Iersel et al. |
| 2003/0104816 | A1 * | 6/2003 | Duplessis et al. ............ 455/448 |
| 2003/0124994 | A1 * | 7/2003 | Ylitalo ............................ 455/91 |
| 2003/0198201 | A1 * | 10/2003 | Ylitalo et al. ................ 370/329 |
| 2005/0047386 | A1 | 3/2005 | Yi |
| 2005/0083875 | A1 * | 4/2005 | Sato .............................. 370/328 |
| 2008/0013500 | A1 | 1/2008 | Laroia et al. |
| 2008/0159208 | A1 | 7/2008 | Kloker et al. |

(Continued)

FOREIGN PATENT DOCUMENTS

EP   2 037 608 A1   3/2009
WO   WO 2010/053873 A1   5/2010

OTHER PUBLICATIONS

Interoperability Specification (IOS) for CDMA 2000. Access Network Interfaces. 3GPP2 (2001).*

(Continued)

*Primary Examiner* — Mark Rinehart
*Assistant Examiner* — Ellen A Kirillova
(74) *Attorney, Agent, or Firm* — Patent Portfolio Builders, PLLC

(57) ABSTRACT

A base station and a method therein are provided for supporting pilot channel selection for a mobile station. A base station has disposal of at least two pilot channels in its cell, and determines pilot channel(s) out of the pilot channels suitable to use for the mobile station. If the determined pilot channel(s) is not currently being used by the mobile station, then the base station starts to transmit the determined pilot channel(s) signals to the mobile station and receives a confirmation from the mobile station confirming their use. If the mobile station was using another pilot channel of the pilot channels than the determined pilot channel(s) and if no other mobile station is using the other pilot channel, then the base station terminates transmission of the other pilot channel.

20 Claims, 5 Drawing Sheets

(56) References Cited

U.S. PATENT DOCUMENTS

2009/0175228 A1 7/2009 Kimura et al.
2009/0257387 A1 10/2009 Gholmieh et al.
2010/0271993 A1 10/2010 Byard et al.

OTHER PUBLICATIONS

W-CDMA: Mobile Communications System. John Wiley & Sons, Ltd. Edited by Keiji Tachikawa (2002).*
3GPP TS 25.214 V8.10.0 (Sep. 2010) $3^{rd}$ Generation Partnership Project; Technical Specification Group Radio Access Network; Physical layer procedures (FDD) (Release 8); 95 pages.
3GPP TS 25.215 V9.2.0 (Mar. 2010) $3^{rd}$ Generation Partnership Project; Technical Specification Group Radio Access Network; Physical layer; Measurements (FDD) (Release 9); 23 pages.
European Communication pursuant to Article 94(3) EPC; European Patent Application No. EP 11 859 939.8-1857, mailed Oct. 10, 2014, 4 pages.
International Search Report, PCT/SE2011/050244, Dec. 7, 2011.
Written Opinion of the International Searching Authority, PCT/SE2011/050244, Dec. 7, 2011.
3GPP TS 25.331 V10.2.0 (Dec. 2010) $3^{rd}$ Generation Partnership Project; Technical Specification Group Radio Access Network; Radio Resource Control (RRC); Protocol specification (Release 10) URL:http://www.3gpp.org/ftp/Specs/html-info/25331.htm; abstract; chapters 8.6.6.12 and 8.6.6.13.
3GPP TS 25.211 V10.0.0 (Sep. 2010) $3^{rd}$ Generation Partnership Project; Technical Specification Group Radio Access Network; Physical channels and mapping of transport channels onto physical channels (FDD) (Release 10) URL:http://www.3gpp.org/ftp/Specs/html-info/25211.htm; abstract; chapters 5.2.1.2 and 5.3.3.12.
Supplementary European Search Report for European Application No. EP 11 85 9939, mailed Jul. 17, 2014, 3 pages.

* cited by examiner

PILOT SIGNAL ASSIGNMENT

CROSS REFERENCE TO RELATED APPLICATION

This application is a 35 U.S.C. §371 national stage application of PCT International Application No. PCT/SE2011/050244, filed on 3 Mar. 2011, the disclosure and content of which is incorporated by reference herein in its entirety. The above-referenced PCT International Application was published in the English language as International Publication No. WO 2012/118417 A1 on 7 Sep. 2012.

TECHNICAL FIELD

The invention relates generally to assignment of pilot signals. The invention relates in particular to a base station and a method therein for supporting pilot channel selection for a mobile station in a wireless communication network comprising cells with base stations, wherein the base station has disposal of at least two pilot channels.

BACKGROUND

Pilot signals are a vital component in any communication system. The pilot signals are used at the receiver to estimate the channel, to provide a phase reference for the demodulation and to estimate the received signal for link adaptation and/or power control. There are two types of pilot signals (or pilots): dedicated or common. A dedicated pilot can be used by one receiver only, whereas a common pilot can be used by several receivers. A common pilot signal only makes sense in a point-to-multipoint channel.

A Base Station Controller, BSC, or a Radio Network Controller, RNC, determines which pilot signal(s) a mobile station shall use. The BSC or RNC may base the decision of which pilot channel(s) to use on several different parameters or factors. Hereinafter, when referring to an RNC, also a BSC may be intended. The RNC will receive measurement reports from the mobile stations via base stations. Further, the base stations may perform measurements regarding e.g. signal quality and report these measurements to the RNC.

In certain circumstances, a mobile station may need to switch between different pilot signals within a cell. There may be several reasons for frequent changes of pilot channels. For example, the mobile station may be moving around within the cell such that it is necessary to switch pilot channels. According to another example, the radio conditions at the particular location of the mobile station may be such that switching of pilot channels will occur frequently.

In such cases, large amount of resources are required of the RNC to constantly perform calculations in order to optimize the use of the available pilot channels within the cell. Further, in such cases, the interface between the RNC and the base station will be heavily loaded with different kinds of signaling.

In WCDMA, common pilots are commonly used in the downlink (DL). In the 3GPP standard, two types of DL common pilots have been defined. They are called Primary Common Pilot Channel (P-CPICH) and Secondary Common Pilot Channel (S-CPICH). The P-CPICH uses a unique (defined in the standard) channelization code, and there can be only one P-CPICH in each cell.

The default is that the mobile station uses the P-CPICH for all relevant purposes. However, under some circumstances, the S-CPICH is preferred. When a mobile station detects that one or several S-CPICH are transmitted in its vicinity, it transmits a measurement report to the radio network controller (RNC), indicating which S-CPICH it has detected and the relative merits of this S-CPICH.

Upon reception of such a measurement report, the RNC may determine that the mobile station should start using the S-CPICH, rather than the default P-CPICH. The RNC then sends a message to the mobile station via the base station. When the mobile station receives this message, it acknowledges the message and starts using the S-CPICH rather than the P-CPICH.

The procedure is the same when the mobile station is currently using one S-CPICH and desires to start using another S-CPICH.

Originally, the S-CPICH was introduced to enable the application of adaptive antennas, where one antenna with multiple beams covers one cell, and any dedicated data transmission takes place over one of the beams, thereby reducing the interference in the system. The area covered by one beam is called a cell portion. Different S-CPICHs must be used in different beams. Note that in the UL, the base station would receive signals from all beams, and use them all to decode the signal transmitted from a mobile.

What beam is used for transmission is decided by the Radio Network Controller (RNC). This decision is primarily based on measurement reports from the mobile, but measurements from the base station may also be taken into account.

When the decision has been made, the RNC then orders the base station to start transmitting over the selected beam. As previously described, the RNC also signals to the mobile to start using a new S-CPICH. With these actions, the RNC implicitly orders the mobile station to receive the data transmitted over the new beam. The RNC uses Radio Resource Control (RRC) signaling to convey the S-CPICH command to the mobile.

Another application of the S-CPICH is a system using remote radio units (RRUs). Here, the radio signals are transmitted from remote radio head (RHs). Each radio head is connected to a central node using optical fibers. Traditionally, each RH creates an entire cell, but an alternative application would be that each RH creates a cell portion. Mobility between cell portions is handled as for the multi-beam case described above.

Yet another application of the S-CPICH is dynamic, mobile-specific beam forming. Here, each base station antenna is equipped with several antenna elements, where the phase and amplitude of the signal transmitted from each antenna element can be dynamically controlled. By performing individual adjustment of the phase and amplitude of each antenna element, it becomes possible to steer the transmission with a high degree of freedom. Not only is it possible to transmit the signal in certain directions, it is also possible to avoid transmitting interference in other directions. To facilitate demodulation of the signal at the receiver, a pilot signal has to be transmitted using the same antenna element weights. Here, the P-CPICH cannot be used. Instead, the S-CPICH may be used.

There are, however, some problems associated with the known solution. The problems become even more palpable when a mobile station is close to a border between cell portions and there is a need to frequently assign a new S-CPICH. The process is slow due to filtering of the measurements in the mobile and the signaling delay. The filtered measurement needs to be above a certain level for a certain time before it is transmitted from the terminal. The processing capacity of the RNC limits the rate with which the pilot assignment can be updated and the use of downlink measurements makes it necessary for the S-CPICH to be transmitted continuously, which wastes capacity.

SUMMARY

It is an object of the exemplifying embodiments to address at least some of the problems outlined above. In particular, it is an object of the exemplifying embodiments to support pilot channel selection for a mobile station in a wireless communication network comprising cells with base stations, wherein the base station has disposal of at least two pilot channels. These objects and others may be obtained by providing a base station and a method in a base station according to the independent claims attached below.

According to an aspect, a method in a base station for supporting pilot channel selection for a mobile station in a wireless communication network comprising cells with base stations is provided. The base station has disposal of at least two pilot channels and the mobile station is being served by the base station. The method comprises the base station determining at least one suitable pilot channel out of the at least two pilot channels suitable to use for the mobile station being located within a coverage area of the base station.

If the determined suitable pilot channel(s) is/are not currently being used by the mobile station, then the base station starts to transmit the pilot channel(s) and signals to the mobile station the determined suitable pilot channel(s) for use. The method further comprises the base station receiving a confirmation from the mobile station confirming use of the determined suitable pilot channel(s). If the mobile station was using another pilot channel of the at least two pilot channels than the determined suitable pilot channel(s) and if no other mobile station is using the other pilot channel, then the base station terminates transmission of the other pilot channel.

If the mobile station is already using the determined suitable pilot channel(s), then the base station continues to transmit the determined suitable pilot channel(s).

According to an embodiment, the method is used in a Code Division Multiple Access, CDMA, communication system.

According to yet an embodiment, the method is used in a Wideband CDMA, WCDMA, communication system.

According to still an embodiment, each cell is divided into a plurality of cell portions, wherein the at least two pilot channels are common pilot channels, wherein each cell portion is associated with at least one respective Secondary Common Pilot Channel, S-CPICH, such that the at least two common pilot channels comprises the S-CPICHs. In this embodiment, the method comprises the base station determining at least one S-CPICH, associated with a respective cell portion, suitable to use for the mobile station being located within a coverage area of the base station. The base station starts to transmit the S-CPICH(s) and data over the cell portion associated with the S-CPICHs, and signals to the mobile station the determined S-CPICH(s) for use.

The method further comprises the base station receiving a confirmation from the mobile station indicating that the mobile station is using the determined S-CPICH(s). If the mobile station was using a Primary Common Pilot Channel, P-CPICH, then the base station terminates transmission of data over the cell associated with the P-CPICH; and if the mobile station was already using at least one old S-CPICH, then the base station terminates transmission of data over the cell portion associated with the old S-CPICH(s).

According to an embodiment, the signaling between the base station and the mobile station is performed using layer one signaling using a dedicated order on a High-Speed Shared Control Channel, HS-SCCH.

According to yet an embodiment, the confirmation is received on a High Speed Dedicated Physical Control Channel, HS-DPCCH.

According to an aspect, a base station adapted to support pilot channel selection for a mobile station in a wireless communication network comprising cells with base stations wherein the base station has disposal of at least two pilot channels in its cell is provided. The base station comprises a communication unit adapted to communicate with the mobile station, The base station further comprises a processing unit adapted to determine at least one suitable pilot channel out of the at least two pilot channels suitable to use for the mobile station being located within a coverage area of the base station.

If the determined suitable pilot channel(s) is/are not currently being used by the mobile station, then the communication unit is further adapted to start transmitting the pilot channel(s) and to signal to the mobile station the determined suitable pilot channel(s) for use. The communication unit is adapted to receive a confirmation from the mobile station confirming use of the determined suitable pilot channel(s). If the mobile station was using another pilot channel of the at least two pilot channels than the determined suitable pilot channel(s) and if no other mobile station is using the other pilot channel, then the communication unit is adapted to terminate transmission of the other pilot channel.

If the mobile station is already using the determined suitable pilot channel(s), then the communication unit is adapted to continue to transmit the determined suitable pilot channel(s).

According to an embodiment of the base station, the base station is used in a Code Division Multiple Access, CDMA, communication system.

According to yet an embodiment, the base station is used in a Wideband CDMA, WCDMA, communication system.

According to still an embodiment, each cell is divided into a plurality of cell portions, wherein the at least two pilot channels are common pilot channels, wherein each cell portion is associated with at least one respective Secondary Common Pilot Channel, S-CPICH, such that the at least two common pilot channels comprises the S-CPICHs. The processing unit is adapted to determine at least one S-CPICH associated with a respective cell portion suitable to use for the mobile station when located within a coverage area of the base station. The processing unit is adapted to start transmitting the S-CPICH(s) and data over the cell portion associated with the S-CPICH(s), and to signal to the mobile station the determined S-CPICH(s) for use, via the communication unit.

The processing unit is further adapted to receive a confirmation from the mobile station indicating that the mobile station is using the determined S-CPICH(s).

If the mobile station is using a Primary Common Pilot Channel, P-CPICH, then the processing unit is adapted to terminate transmission of data over the P-CPICH; and if the mobile station is already using at least one old S-CPICH, then the processing unit is adapted to terminate transmission of data over the cell portion associated with the old S-CPICH(s).

According to an embodiment, the signaling between the base station and the mobile station is performed using layer 1 signaling using a dedicated order on a High-Speed Shared Control Channel, HS-SCCH.

According to an embodiment, the processing unit is adapted to receive the confirmation on a High Speed Dedicated Physical Control Channel, HS-DPCCH.

According to an aspect, a layer one control signal order is provided. The order contains at least a first field indicating that the order contains an order indicating a Secondary Common Pilot Channel, S-CPICH, among a plurality of S-CPICHs, for use in a wireless communication network comprising cells with base stations, wherein each cell is divided into cell portions, wherein each cell portion is associated with a specific S-CPICH. The order further comprises at least a second field indicating the S-CPICHs for use.

According to an embodiment, the order is a High-Speed Shared Control Channel message.

According to an aspect, a method in a mobile station in a wireless communication network comprising cells with base stations wherein a base station has disposal of at least two pilot channels in its cell is provided. The method comprises receiving signaling from the base station comprising an indication of at least one pilot channel to use, starting to use the indicated pilot channel(s) and sending a confirmation to the base station confirming use of the indicated pilot channel(s).

According to an embodiment, the indicated pilot channel is a Secondary Common Pilot Channel, S-CPICH.

According to yet an embodiment, the signaling received from the base station is performed using layer one signaling using a dedicated order on a High-Speed Shared Control Channel, HS-SCCH.

According to still an embodiment, the confirmation is sent to the base station on a High Speed Dedicated Physical Control Channel, HS-DPCCH.

According to an aspect, a mobile station in a wireless communication network comprising cells with base stations, wherein a base station has disposal of at least two pilot channels in its cell is provided. The mobile station comprises a communication unit, adapted to receive signaling from the base station comprising an indication of at least one pilot channel to use, to start using the indicated pilot channel(s) and to send a confirmation to the base station confirming use of the indicated pilot channel(s).

According to an embodiment, the indicated pilot channel is a Secondary Common Pilot Channel, S-CPICH.

According to yet an embodiment, the communication unit is adapted to receive signaling from the base station using layer one signaling using a dedicated order on a High-Speed Shared Control Channel, HS-SCCH.

According to still an embodiment, the communication unit is adapted to send the confirmation to the base station on a High Speed Dedicated Physical Control Channel, HS-DPCCH.

The methods, the base station and the mobile station have several advantages.

An advantage is that the decision regarding which pilot channel to use is taken by the base station and not the Base Station Controller, BSC, or the Radio Network Controller, RNC. This enables the decision to be taken quickly as the signaling does not have to go up to the BSC or RNC. Also the base station has access to more information regarding the channel qualities in uplink and downlink than what is signaled up to the BSC or RNC and hence can make a more well-founded decision.

Another advantage is that it reduces the signaling between the base station and the RNC and it reduces the processing load in the RNC.

Another advantage is that it reduces the time to make the decision to start using a new S-CPICH, thereby enabling a quicker change in S-CPICH(s) which may improve the, by the user, experienced quality of the communication system. It may help in balancing the load in the different cell portions associated with different S-CPICHs. Yet an advantage is that all S-CPICHs need not be continuously transmitted to enable downlink measurements.

BRIEF DESCRIPTION OF DRAWINGS

The embodiments will now be described in more detail by means of exemplary embodiments and with reference to the accompanying drawings, in which.

DETAILED DESCRIPTION

Briefly described, a method and a base station for supporting pilot channel selection for a mobile station in a wireless communication network are provided. The communication network comprises cells with base stations. For the communication with the mobiles, the base station has the possibility to use one or several pilots from a set of pilots. Further, a mobile station for use in such a wireless communication network comprising the base station is provided, as is a method in such a mobile station.

Figure 1:
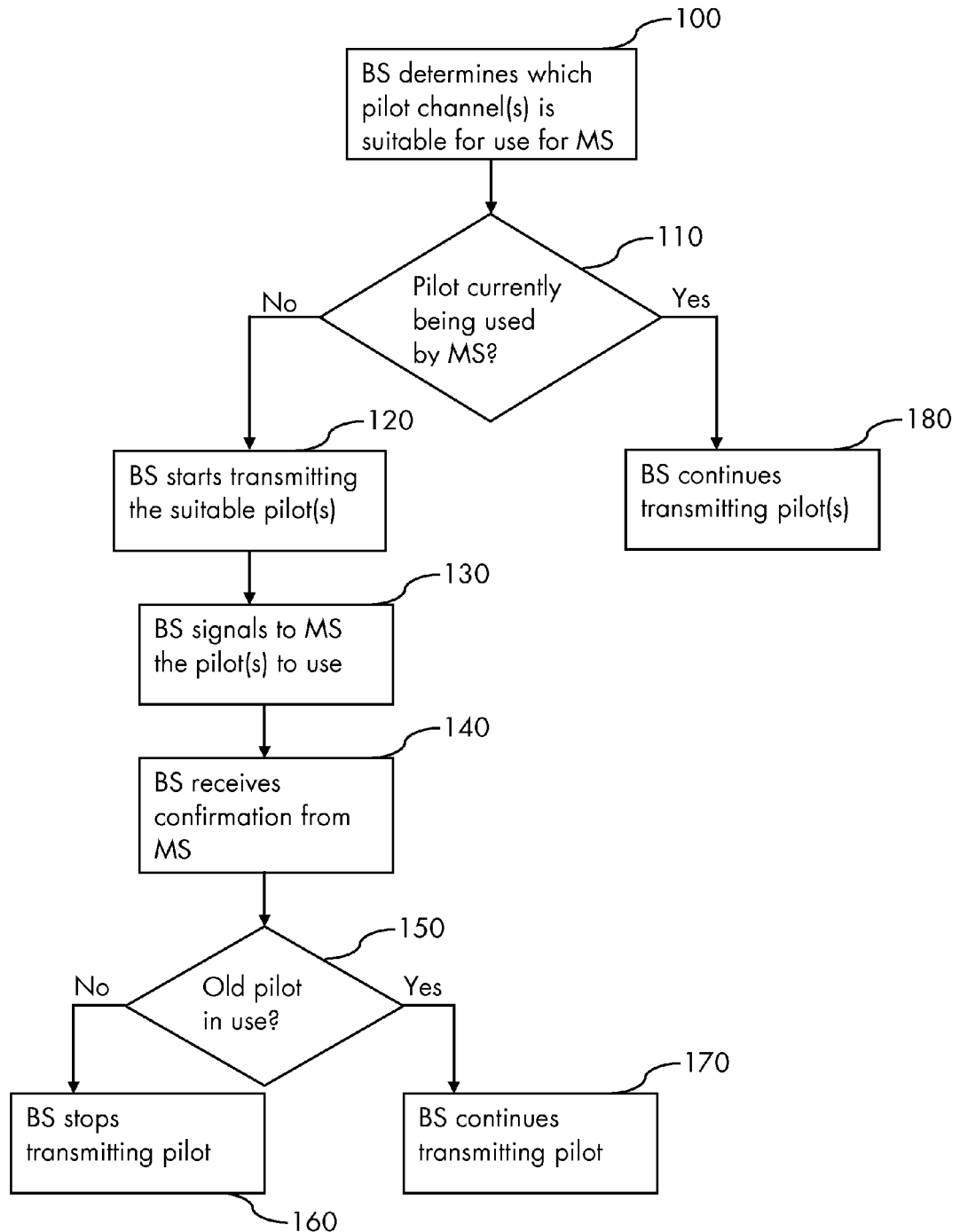
FIG. 1 is a flow chart of an exemplary method in a base station for supporting pilot channel selection for a mobile station in a wireless communication network comprising cells with base stations.

FIG. 1 is a flow chart of an exemplifying method in a base station for supporting pilot channel selection for a mobile station in a wireless communication network comprising cells with base stations. The base station has disposal of at least two pilot channels and the mobile station is being served by the base station.

FIG. 1 illustrates the method comprising the base station determining 100 at least one suitable pilot channel out of the at least two pilot channels suitable to use for the mobile station. This decision may be based on uplink measurements performed by the base station and/or downlink measurement reports from the mobile station.

The base station checks 110 if the determined suitable pilot channel(s) is/are currently being used by the mobile station. If so, the base station continues transmitting 180 the determined suitable pilot channel(s). However, if the mobile station is not using the determined suitable pilot channel(s), the base station starts transmitting 120 the determined suitable pilot channel(s).

The method further comprises the base station signaling 130 to the mobile station the determined suitable pilot channel(s) to use and the base station receiving 140 a confirmation from the mobile station confirming use of the determined suitable pilot channel(s).

Then the base station checks 150 if the mobile station was using another pilot channel of the at least two pilot channels and if so, if another mobile station is currently using that pilot channel. If the mobile station was using another pilot channel of the at least two and if no other mobile station is currently using that pilot channel, the base station terminates 160 transmission of that pilot channel.

However, if the mobile station was using another pilot channel of the at least two and if another mobile station is currently using that pilot channel, the base stations continues 170 transmitting the pilot channel.

This method has several advantages. One advantage is that the decision regarding which pilot channel to use is taken by the base station and not the Base Station Controller, BSC, or the Radio Network Controller, RNC. This enables the decision to be taken quickly as the signaling does not have to go up to the BSC or RNC. Also the base station has access to more information regarding the channel qualities in uplink and downlink than what is signaled up to the BSC or RNC and hence can make a more well-founded decision.

According to an embodiment, the method in the base station is used in a Code Division Multiple Access, CDMA, communication system. In other words, the base station in which the method is performed is a base station adapted to be used in a CDMA communication system or network.

According to yet an embodiment, the method in the base station is used in a Wideband CDMA, WCDMA, communication system. In other words, the base station in which the method is performed is a base station adapted to be used in a WCDMA communication system or network.

Figure 2:
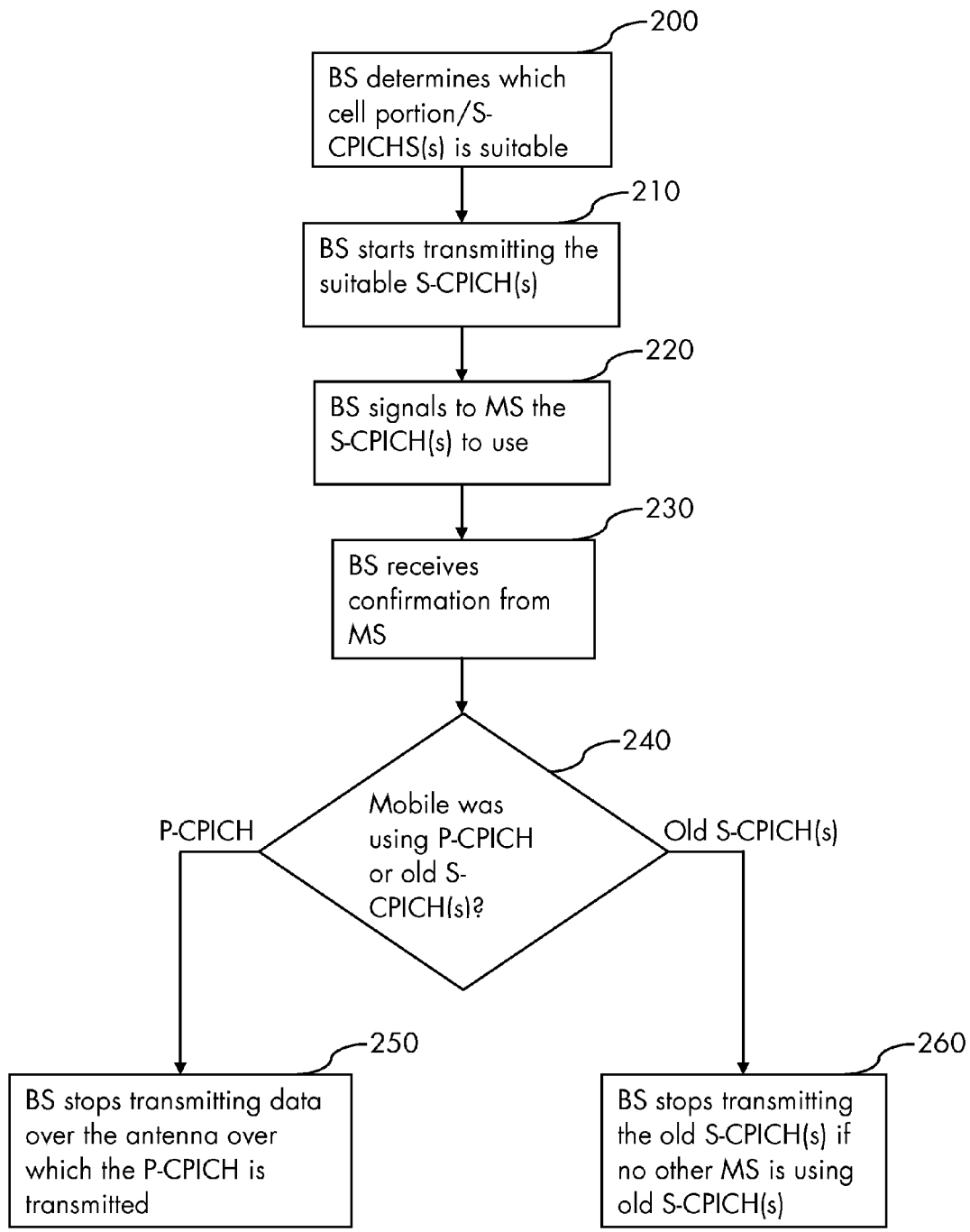
FIG. 2 is a flow chart of another exemplary method in a base station for supporting pilot channel selection for a mobile station in a wireless communication network comprising cells with base stations and each cell is divided into a plurality of cell portions.

FIG. 2 is a flow chart of an exemplifying embodiment method in a base station for supporting pilot channel selection for a mobile station in a wireless communication network comprising cells with base stations where each cell is divided into a plurality of cell portions. For the communication with each mobile, the base station has the possibility to use one or several pilots from a set of pilots.

FIG. 2 illustrates the method comprising the base station determining 200 at least one S-CPICH associated with a respective cell portion suitable to use for the mobile station being located within a coverage area of the first base station. The method further comprises the base station starting to transmit 210 the S-CPICH(s) and data over the cell portion associated with the S-CPICH(s) and signaling 220 to the mobile station the determined S-CPICH(s) for use. The method further comprises the base station receiving 230 a confirmation from the mobile station indicating that the mobile station is using the determined S-CPICH. If no other mobile is using the old pilot, then the old pilot is switched off as the base station receives this confirmation If the mobile station was using a P-CPICH, then the base station terminates transmission of data over the cell associated with the P-CPICH; and if the mobile station was already using an old S-CPICH, then the base station terminates transmission of data over the cell portion associated with the old S-CPICH.

As was described above, there are two scenarios or cases. One is that the mobile station is using a P-CPICH when it receives the signaling 220 from the base station, the signaling comprising an order of the determined S-CPICH(s) for use. The other is that the mobile station is using at least one S-CPICH, also referred to as at least one old S-CPICH, when it receives the signaling 220 from the base station, the signaling comprising an order of the determined S-CPICH(s) for use. These two scenarios or cases correspond to the mobile station just entering the cell or coverage area of the base station when using a P-CPICH; or the mobile station already being located within the cell or coverage area of the base station when using at least one old S-CPICH.

Beginning with the first case, the mobile enters the cell or coverage area of the base station and is hence using a P-CPICH. The P-CPICH is transmitted so that is can be reliably received in the entire cell. One of its uses is to make it possible to identify what primary scrambling codes is used in the cell. This identification is necessary to decode any additional transmissions in that cell.

The base station determines 200 at least one S-CPICH associated with a respective cell portion suitable to use for the mobile station. This determination can be based on several factors, e.g. load, capacity, signal strength, signal quality and so on. As the base station has determined 200 at least one S-CPICH associated with a respective cell portion suitable to use for the mobile station, the base station starts using this determined S-CPICH(s). This means that the base station starts transmitting the S-CPICH(s) and data intended for the mobile station over the cell portion which is associated with the determined S-CPICH(s). The base station also signals 220 to the mobile station the determined S-CPICH(s) for use. In other words, the base station orders the mobile station to start using the determined S-CPICH(s). As the mobile station receives the signaling or the order, the mobile station starts using the determined S-CPICH(s) and signals back to the base station confirming 230 that the mobile station now is using the determined S-CPICH(s). As the base station receives the confirmation 230 from the mobile station, it may stop transmitting data over the antenna where the P-CPICH is transmitted.

In the other case, the mobile station is using at least one S-CPICH, also referred to as old S-CPICH(s), when it receives the signaling 220 from the base station. This means that the mobile station is already located within the cell or coverage area of the base station. The base station determines 200 at least one S-CPICH associated with a respective cell portion suitable to use for the mobile station. This determination can be based on several factors, e.g. load, capacity, signal strength, signal quality and so on. As the base station has determined 200 at least one S-CPICH associated with a respective cell portion suitable to use for the mobile station, the base station starts using this determined S-CPICH(s). This means that the base station starts transmitting the S-CPICH(s) and data intended for the mobile station over the cell portion which is associated with the determined S-CPICH(s). The base station also signals 220 to the mobile station the determined S-CPICH(s) for use. In other words, the base station orders the mobile station to start using the determined S-CPICH(s). As the mobile station receives the signaling or the order, the mobile station starts using the determined S-CPICH(s) and signals back to the base station confirming 230 that the mobile station now is using the determined S-CPICH(s). As the base station receives the confirmation 230 from the mobile station, it may stop transmitting data over the cell portion associated with the old S-CPICH(s). The base station may also stop transmitting the old S-CPICH(s), providing that no other mobile station is using it/them.

Both cases have the same and several advantages. One advantage is that it reduces the signaling between the base station and the RNC and it reduces the processing load in the RNC. Another advantage is that it reduces the time to make the decision to start using a new S-CPICH, thereby enabling a quicker change in S-CPICH(s) which may improve the, by the user, experienced quality of the communication system. It may help in balancing the load in the different cell portions associated with different S-CPICHs. Yet an advantage is that all S-CPICHs need not be continuously transmitted to enable downlink measurements.

According to an embodiment, the base station performs uplink measurements and uses these measurements to determine which S-CPICH(s) is suitable to use for the mobile station when located within the coverage area of the base station.

The base station may continuously perform different uplink measurements to evaluate and determine which cell portion and corresponding S-CPICH(s) is suitable to use for the mobile station. As the base station itself can perform these measurements, they need not be measured by another node and then transmitted or signaled to the base station. In previous solutions, the base station would perform these measurements and then signal the measurements to the RNC, thereby causing even more signaling load between the base station and the RNC.

According to an embodiment, the measurements refer to any of signal strength and signal-to-interference ratio.

The base station can measure one of them or both of them and make the determination of which cell portion and hence which S-CPICH(s) to use based on these measurements. The decision may be based on the measurement results from one of them or on both of them in combination.

According to yet an embodiment, the base station uses downlink measurements, performed and reported by the mobile station to determine which cell portion and corresponding S-CPICH(s) is suitable to use for the mobile station when located within the coverage area of the base station.

Also, a combination of both uplink and downlink measurements can be used by the base station in order to determine which cell portion and corresponding S-CPICH(s) is suitable to use for the mobile station. Typically, the base station has access to many different measurements, which are not all reported or signaled to the RNC. Consequently, the base station has access to more information than the RNC and may therefore make a decision based on more measurements than the RNC.

In an example, the signaling between the base station and the mobile station is performed using layer one signaling using a dedicated order on a High-Speed Shared Control Channel, HS-SCCH.

As previously described, the RNC typically signals to the UE which S-CPICH to use, and the base station only relays the message; there is hence no signaling message from the base station to the mobile station. The preferred way to convey such a message in WCDMA is to use a layer one message, since there is no layer 2 link between the base station and the mobile station. Hence, a new dedicated order is introduced in order to signal to the mobile station the determined S-CPICH(s) to use. Using an HS-SCCH order is one way of conveying such a layer one message.

According to an embodiment, the confirmation is received on a High Speed Dedicated Physical Control Channel, HS-DPCCH.

Figure 3:
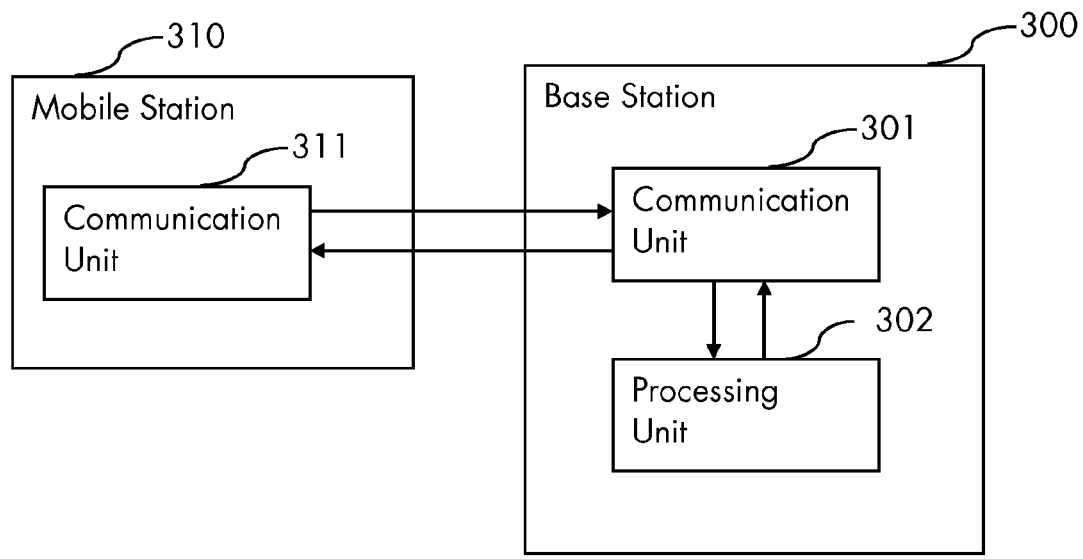
FIG. 3 is an exemplifying block diagram illustrating a base station adapted to support pilot channel selection for a mobile station in a wireless communication network comprising cells with base stations and each cell is divided into a plurality of cell portions.

A base station which is adapted to support pilot channel selection for a mobile station in a wireless communication network comprising cells with base stations and each cell is divided into a plurality of cell portions will now be disclosed with reference to FIG. 3. The base station exhibits the same advantages as the method in the base station described above. Therefore, the base station will be described in brief here, and all the advantages will not be repeated.

FIG. 3 is an exemplifying block diagram illustrating a base station adapted to support pilot channel selection for a mobile station in a wireless communication network comprising cells with base stations. The base station has disposal of at least two pilot channels in its cell.

FIG. 3 illustrates a base station 300 comprising a communication unit 301, adapted to communicate with a mobile station 310. The base station also comprises a processing unit 302 adapted to determine at least one suitable pilot channel out of the at least two pilot channels suitable to use for the mobile station 310 being located within a coverage area of the base station.

The processing unit 302 is further adapted to check if the determined suitable pilot channel(s) is/are not currently being used by the mobile station 310. If so, the communication unit 301 is adapted to start transmitting the determined suitable pilot channel(s) and to signal to the mobile station the determined suitable pilot channel(s) for use. The communication unit 301 is further adapted to receive a confirmation from the mobile station confirming use of the determined suitable pilot channel(s).

If the mobile station was using another pilot channel of the at least two pilot channels than the determined suitable pilot channel and if no other mobile station is using the other pilot channel, then the communication unit 301 is adapted to terminate transmission of the other pilot channel.

If the mobile station 310 is already using the determined suitable pilot channel(s), then the communication unit 301 is adapted to continue to transmit the determined suitable pilot channel(s).

According to an embodiment, the base station is used in a CDMA communication system.

According to yet an embodiment, the base station is used in a WCDMA communication system.

According to yet an embodiment, each cell is divided into a plurality of cell portions and the at least two pilot channels are common pilot channels. Each cell portion is associated with at least one SCPICH such that the at least two common pilot channels comprises the S-CPICHs.

The processing unit 302, is adapted to determine at least one S-CPICH associated with a respective cell portion suitable to use for the mobile station 310 when located within a coverage area of the base station 300. The processing unit 302 is further adapted to start transmitting the S-CPICH(s) and data over the cell portion associated with the S-CPICH(s), and to signal to the mobile station 210 the determined S-CPICH(s) for use, via the communication unit 301. Further, the processing unit 302 is adapted to receive a confirmation from the mobile station 310 indicating that the mobile station is using the determined S-CPICH(s). If the mobile station is using a Primary Common Pilot Channel, P-CPICH, then the processing unit 302 is adapted to terminate transmission of data over the antenna associated with the P-CPICH; and if the mobile station is already using at least one old S-CPICH, then the processing unit 302 is adapted to terminate transmission of data over the cell portion associated with the old S-CPICH(s).

According to an embodiment, the processing unit 302 of the base station 300 is further adapted to perform uplink measurements and use these measurements to determine which S-CPICH(s) and associated respective cell portion is/are suitable to use for the mobile station when located within the coverage area of the base station.

In an example, the measurements refer to any of signal strength and signal-to-interference ratio. This means also that the measurements may refer to both or just one of the signal strength and signal-to-interference ratio.

According to an embodiment, the processing unit 302 of the base station 300 is further adapted to use downlink measurements, which are performed and reported by the mobile station to determine which cell portion and corresponding S-CPICH(s) is/are suitable to use for the mobile station when located within the coverage area of the base station.

In an embodiment, the signaling between the base station 300 and the mobile station 310 is performed using layer 1 signaling using a dedicated order on a High-Speed Shared Control Channel, HS-SCCH.

According to an embodiment, the processing unit 302 of the base station is further adapted to receive said confirmation on a High Speed Dedicated Physical Control Channel, via the communication unit 301.

Figure 4:
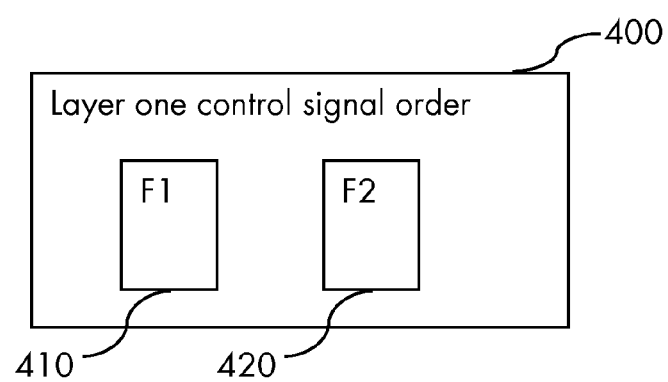
FIG. 4 is a schematic illustration of a new dedicated layer one signaling order from a base station to a mobile station.

FIG. 4 is a schematic illustration of a new dedicated layer one signaling order from a base station to a mobile station.

FIG. 4 schematically illustrates a layer one control signal order 400 comprising at least a first field 410 indicating that the order comprises an order indicating a Secondary Common Pilot Channel, S-CPICH, among a plurality of S-CPICHs, for use in a wireless communication network comprises cells with base stations, wherein each cell is divided into cell portions, wherein each cell portion is associated with a specific S-CPICH. The order 400 also comprises at least a second field 420 indicating the S-CPICHs for use.

The layer one signaling order 400 may comprise other fields than the first and second field mention above, and each field in the order 400 may comprise one or more bits. In this embodiment, the first field 410 specifies the "order type". In other words, the first field indicates to the mobile station what kind of layer one signaling order it is. In this embodiment, the "order type" is an S-CPICH order, meaning it is an order instructing the mobile station to use a specific S-CPICH. The second field comprises the order itself, meaning that the second field comprises the specific S-CPICH that the mobile station is instructed, or ordered, to use.

By introducing a new dedicated signaling order between the base station and the mobile station, it is possible to enable the base station to signal, or to order, the mobile station to use a specific S-CPICH. Thereby the base station is enabled to perform the method as has been described above in relation to FIG. 1.

According to an embodiment, the layer one control signal order is a High-Speed Shared Control Channel (HS-SCCH) message.

Figure 5:
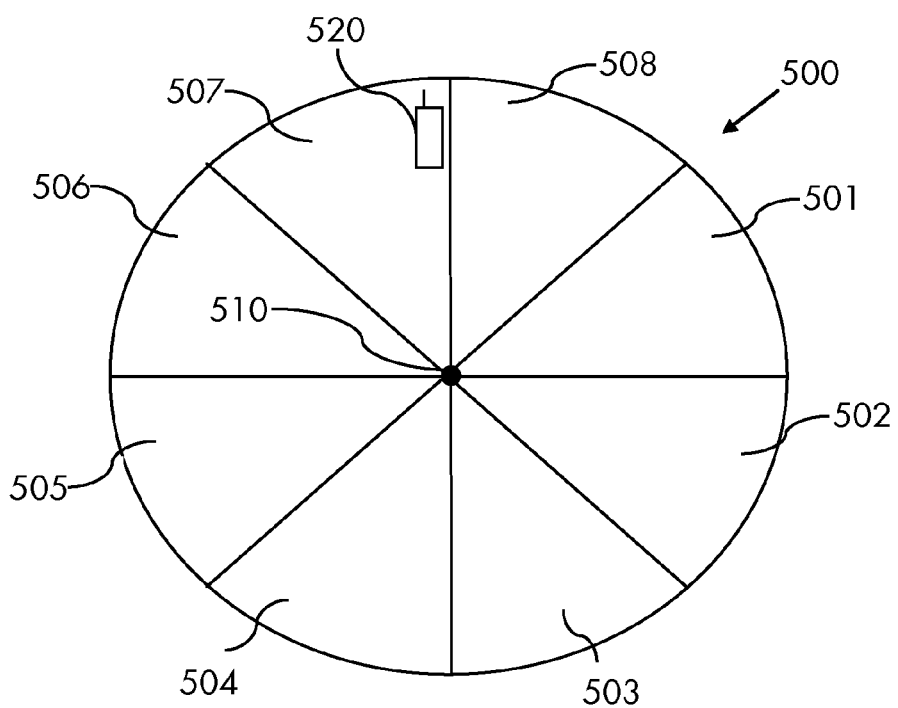
FIG. 5 is an exemplifying illustration of a cell with a base station in a wireless communication network, comprising cells with base stations, which cell is divided into a plurality of cell portions.

FIG. 5 is an exemplifying illustration of a cell with a base station in a wireless communication network, comprising cells with base stations, which cell is divided into a plurality of cell portions.

In the exemplifying scenario of FIG. 5, a base station 510 is located in the middle of a cell 500. The cell in FIG. 5 is circular and it is divided into 8 more or less symmetrical cell portions 501-508. It shall be pointed out that this is a simplified exemplifying illustration. The base station 510 has a coverage area, which in theory roughly corresponds to the cell. The coverage area of the base station can be thought of as the area within which a mobile station may be served by the base station, the mobile station being located within the coverage area. A cell and/or a coverage area need not be circular and it need not be symmetrical. Further the cell portions need not be symmetrical and/or equal in size in relation to each other.

FIG. 5 also illustrates a mobile station 520 being located within the cell 500 or coverage area of the base station 510. The mobile station 520 is located in cell portion number 507 close to the border to cell portion 508. Further in this example, the mobile station is assumed to move about in a random pattern very close to the cell border between cell portion 507 and 508, such that it may sometimes be located in cell portion 507 and sometimes in cell portion 508. It is further assumed there are many other mobile stations located in each of the cell portions 501-508 of the cell 500 and that they are all moving about. This gives cause to continuously changing "radio conditions" in the cell. With radio conditions is meant here, load vs. capacity in each cell portion 501-508, interference, signal strength, signal quality, power consumption, and also other factors.

In such a situation, it might be desirable to quickly and possibly also frequently shift or change the cell portion and hence the S-CPICH(s) for the mobile station. As the base station can continuously measure uplink radio conditions, evaluate the load and available capacity in each cell portion and will also receive measurement reports from, and performed by, the mobile stations located within the cell 500, the base station as described in relation to FIGS. 1-3, is enabled to quickly determine which S-CPICH(s) is/are suitable for the mobile station 520 to use. No signaling need to be done to the RNC in order to make this decision and no processing need to be performed by the RNC in order to make this decision.

Figure 6:
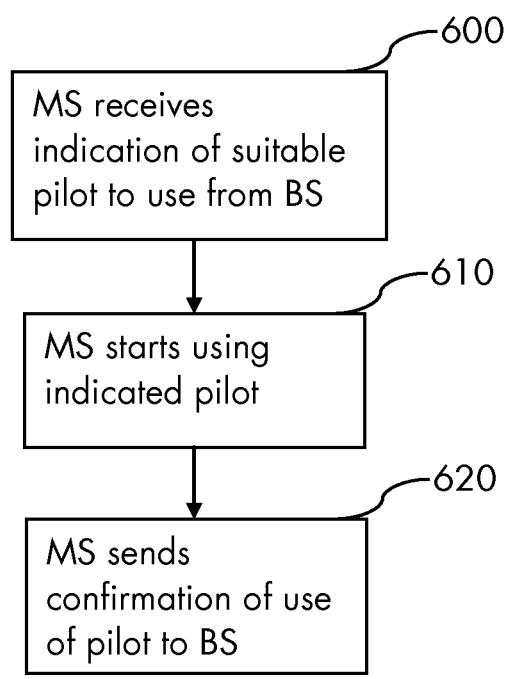
FIG. 6 is a flowchart of an exemplifying method in a mobile station for supporting pilot channel selection.

FIG. 6 is a flow chart of an exemplifying method in a mobile station for supporting pilot channel selection. The mobile station is used in a wireless communication network comprising cells with base stations wherein a base station has disposal of at least two pilot channels in its cell. The method in the mobile station has the same objects and advantages as the base station and the method therein. Therefore, the method in the mobile station will only be briefly described in order to avoid unnecessary repetition.

The method comprises receiving 600 signaling from the base station comprising an indication of at least one pilot channel to use. As has been explained above, this signaling is only sent from the base station if the mobile station is not already using the pilot channel(s). Hence the mobile station starts using 610 the indicated pilot channel(s) and sends 620 a confirmation to the base station to confirm that the mobile station is now using the indicated pilot channel(s).

According to an embodiment, the mobile station is used in a CDMA communication system.

According another embodiment, the mobile station is used in a WCDMA communication system.

In an example, the indicated pilot channel is a Secondary Common Pilot Channel, S-CPICH.

In yet an example, the signaling which is received from the base station is performed using layer one signaling using a dedicated order on a High-Speed Shared Control Channel, HS-SCCH.

In yet an example, the confirmation is sent to the base station on a High Speed Dedicated Physical Control Channel, HS-DPCCH.

An exemplifying embodiment of a mobile station in a wireless communication network comprising cells with base stations, wherein a base station has disposal of at least two pilot channels in its cell, will now be briefly described, again with reference to FIG. 3.

The mobile station 310 comprises a communication unit 311, which is adapted to receive signaling from the base station comprising an indication of at least one pilot channel to use. The communication unit 311 is further adapted to start using the indicated pilot channel(s) and to send a confirmation to the base station confirming that the mobile station is now using the indicated pilot channel(s).

According to an embodiment, the mobile station is used in a CDMA communication system.

According to yet an embodiment, the mobile station is used in a WCDMA communication system.

In an example, the indicated pilot channel is a Secondary Common Pilot Channel, S-CPICH.

According to an example, the communication unit 311 is adapted to receive signaling from the base station using layer-one (L1) signaling using a dedicated order on a High-Speed Shared Control Channel, HS-SCCH.

According to an example, the communication unit 311 is adapted to send the confirmation that the mobile station is now using the indicated pilot channel to the base station on a High Speed Dedicated Physical Control Channel, HS-DPCCH.

It should be noted that FIG. 3 merely illustrates various functional units in the base station in a logical sense. However, the skilled person is free to implement these functions in practice using any suitable software and hardware means. Thus, the invention is generally not limited to the shown structures of the base station and the functional units.

With reference to FIG. 3, the functional units 301-302 described above can be implemented in the base station 300 as program modules of a computer program comprising code means which when run by a processor in the base station 300 causes the base station 300 to perform the above-described functions and actions. The processor may be a single CPU (Central processing unit), or could comprise two or more processing units in the base station 300. For example, the processor may include general purpose microprocessors, instruction set processors and/or related chips sets and/or special purpose microprocessors such as ASICs (Application Specific Integrated Circuit). The processor may also comprise board memory for caching purposes.

The computer program may be carried by a computer program product CPP in the base station 300 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the base station 300.

While the invention has been described with reference to specific exemplary embodiments, the description is generally only intended to illustrate the inventive concept and should not be taken as limiting the scope of the invention. The present invention is defined by the appended claims.

The invention claimed is:

1. A method in a base station for supporting pilot channel selection for a mobile station in a wireless communication network comprising cells with base stations, wherein said base station has disposal of at least two pilot channels in its cell and each cell is divided into a plurality of cell portions, wherein said at least two pilot channels are common pilot channels, wherein each cell portion is associated with at least one respective Secondary Common Pilot Channel, S-CPICH, such that said at least two common pilot channels comprises said S-CPICHs, said method comprising:
    said base station determining at least one S-CPICH, associated with a respective cell portion, suitable to use for said mobile station being located within a coverage area of said base station,
    said base station starting to transmit said S-CPICH(s) and data over said cell portion associated with said S-CPICHs,
    said base station signalling to said mobile station said determined S-CPICH(s) for use,
    said base station receiving a confirmation from said mobile station indicating that said mobile station is using said determined S-CPICH(s),
    when said mobile station was using a Primary Common Pilot Channel, P-CPICH, then said base station terminating transmission of data over the cell associated with said P-CPICH, and
    when said mobile station was already using at least one old S-CPICH, then said base station terminating transmission of data over the cell portion associated with said old S-CPICH(s).

2. A method according to claim 1, wherein said base station performs uplink measurements and uses these measurements to determine which S-CPICH cell portion is suitable to use for said mobile station when located within said coverage area of said base station.

3. A method according to claim 2, wherein said measurements refer to one or both of signal strength and signal-to-interference ratio.

4. A method according to claim 1, wherein said base station uses downlink measurements, performed and reported by said mobile station to determine which S-CPICH is suitable to use for said mobile station when located within said coverage area of said base station.

5. A method according to claim 1, wherein said signalling between said base station and said mobile station is performed using layer one signalling using a dedicated order on a High-Speed Shared Control Channel, HS-SCCH.

6. A method according to claim 1, wherein said confirmation is received on a High Speed Dedicated Physical Control Channel, HSDPCCH.

7. A base station, configured to support pilot channel selection for a mobile station in a wireless communication network comprising cells with base stations wherein said base station has disposal of at least two pilot channels in its cell and each cell is divided into a plurality of cell portions, wherein said at least two pilot channels are common pilot channels, wherein each cell portion is associated with at least one respective Secondary Common Pilot Channel, S-CPICH, such that said at least two common pilot channels comprises said S-CPICHs, said base station comprising:
    an antenna configured to communicate with said mobile station,
    a memory coupled to a processor, and
    the processor, configured to:
    determine at least one S-CPICH associated with a respective cell portion suitable to use for said mobile station when located within a coverage area of said base station, and
    said antenna being further configured to:
    start transmitting said S-CPICH(s) and data over said cell portion associated with said S-CPICH(s),
    signal to said mobile station said determined S-CPICH(s) for use,
    receive a confirmation from said mobile station indicating that said mobile station is using said determined S-CPICH(s),
    when said mobile station is using a Primary Common Pilot Channel, P-CPICH, then said processor is configured to terminate transmission of data over said P-CPICH, and
    when said mobile station is already using at least one old S-CPICH, then said processor is configured to terminate transmission of data over the cell portion associated with said old S-CPICH(s).

8. A base station according to claim 7, wherein said processor configured to perform uplink measurements and use these measurements to determine which S-CPICH is suitable to use for said mobile station when located within said coverage area of said base station.

9. A base station according to claim 8, wherein said measurements refer to one or both of signal strength and signal-to-interference ratio.

10. A base station according to claim 7, wherein said processor is configured to use downlink measurements, performed and reported by said mobile station to determine which S-CPICH is suitable to use for said mobile station when located within said coverage area of said base station.

11. A base station according to claim 7, wherein said signalling between said base station and said mobile station is performed using layer 1 signalling using a dedicated order on a High-Speed Shared Control Channel, HS-SCCH.

12. A base station according to claim 7, wherein said processor is configured to receive said confirmation on a High Speed Dedicated Physical Control Channel, HS-DPCCH.

13. A method in a mobile station in a wireless communication network comprising cells with base stations wherein a base station has disposal of at least two pilot channels in its cell and each cell is divided into a plurality of cell portions, wherein said at least two pilot channels are common pilot channels, wherein each cell portion is associated with at least one respective Secondary Common Pilot Channel, S-CPICH, such that said at least two common pilot channels comprises said S-CPICHs, said method comprising:
- receiving signaling from said base station comprising an indication of S-CPICH(s) to use based on a determination by said base station of at least one S-CPICH, associated with a respective cell portion, suitable to use for said mobile station being located within a coverage area of said base station,
- starting to use said indicated S-CPICH,
- sending a confirmation to said base station indicating use of said determined S-CPICH(s),
- when said mobile station was using a Primary Common Pilot Channel, P-CPICH, then said mobile station receiving a message for terminating transmission of data over the cell associated with said P-CPICH, and
- when said mobile station was already using at least one old S-CPICH, then said mobile station receiving a message for terminating transmission of data over the cell portion associated with said old S-CPICH(s).

14. A method in a mobile station according to claim 13, wherein said indicated pilot channel is a Secondary Common Pilot Channel, S-CPICH.

15. A method in a mobile station according to claim 13, wherein said signalling received from said base station is performed using layer one signalling using a dedicated order on a High-Speed Shared Control Channel, HSSCCH.

16. A method in a mobile station according to claim 13, wherein said confirmation is sent to said base station on a High Speed Dedicated Physical Control Channel, HS-DPCCH.

17. A wireless communication network comprising:
- cells with base stations, wherein a base station has disposal of at least two pilot channels in its cell and each cell is divided into a plurality of cell portions, wherein said at least two pilot channels are common pilot channels, wherein each cell portion is associated with at least one respective Secondary Common Pilot Channel, S-CPICH, such that said at least two common pilot channels comprises said S-CPICHs and
- a mobile station configured to:
  - receive signaling from said base station comprising an indication of S-CPICH(s) to use based on a determination by said base station of at least one S-CPICH, associated with a respective cell portion, suitable to use for said mobile station being located within a coverage area of said base station,
  - starting to use said indicated S-CPICH,
  - sending a confirmation to said base station indicating use of said determined S-CPICH(s),
  - when said mobile station was using a Primary Common Pilot Channel, P-CPICH, then said mobile station receiving a message for terminating transmission of data over the cell associated with said P-CPICH, and
  - when said mobile station was already using at least one old S-CPICH, then said mobile station receiving a message for terminating transmission of data over the cell portion associated with said old S-CPICH(s).

18. A wireless communication network according to claim 17, wherein said indicated pilot channel is a Secondary Common Pilot Channel, S-CPICH.

19. A wireless communication network according to claim 17, wherein said mobile station is adapted to receive signalling from said base station using layer one signalling using a dedicated order on a High-Speed Shared Control Channel, HS-SCCH.

20. A wireless communication network according to claim 17, wherein said mobile station is adapted to send said confirmation to said base station on a High Speed Dedicated Physical Control Channel, HS-DPCCH.

* * * * *